United States Patent
Simske et al.

(10) Patent No.: US 8,390,874 B2
(45) Date of Patent: Mar. 5, 2013

(54) OPTIMAL RESOLUTION IMAGING SYSTEM AND METHOD

(75) Inventors: Steven J. Simske, Fort Collins, CO (US); Roland J. Burns, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1394 days.

(21) Appl. No.: 10/989,781

(22) Filed: Nov. 16, 2004

(65) Prior Publication Data

US 2006/0082794 A1    Apr. 20, 2006

(51) Int. Cl.
*G06K 15/02* (2006.01)
*H04N 1/60* (2006.01)

(52) U.S. Cl. .......... 358/1.2; 358/1.9; 358/2.1; 358/3.27; 382/239; 382/299

(58) Field of Classification Search .................. 358/1.2, 358/1.9, 2.1, 3.27; 382/239, 299
See application file for complete search history.

(56) References Cited

U.S. PATENT DOCUMENTS

| | | | |
|---|---|---|---|
| 4,680,642 A | 7/1987 | Shimano et al. | |
| 4,782,399 A | 11/1988 | Sato | |
| 4,924,509 A | 5/1990 | Yokomizo | |
| 5,946,110 A | 8/1999 | Hu et al. | |
| 6,160,249 A | 12/2000 | Webb et al. | |
| 6,483,609 B1 | 11/2002 | Ueno et al. | |
| 2003/0007695 A1* | 1/2003 | Bossut et al. | 382/239 |
| 2004/0027593 A1* | 2/2004 | Wilkins | 358/1.2 |
| 2004/0105129 A1* | 6/2004 | Kawakami | 358/2.1 |

FOREIGN PATENT DOCUMENTS

| | | |
|---|---|---|
| JP | 08223410 A | 8/1996 |
| JP | 2002264403 A | 9/2002 |

OTHER PUBLICATIONS

DE 4 MO Office Action, dated Aug. 1, 2008, not translated, 4 pages.

* cited by examiner

*Primary Examiner* — David K Moore
*Assistant Examiner* — Quang N Vo

(57) ABSTRACT

An optimal resolution imaging system comprises a resolution engine adapted to apply at least one resolution rule to at least one zone of an object to determine an optimal reduced resolution setting for the at least one zone while maintaining a predetermined quality level for the at least one zone.

18 Claims, 3 Drawing Sheets

OPTIMAL RESOLUTION IMAGING SYSTEM AND METHOD

TECHNICAL FIELD OF THE INVENTION

The present invention relates generally to the field of imaging systems and, more particularly, to an optimal resolution imaging system and method.

BACKGROUND OF THE INVENTION

Storing or converting analog documents or objects to a digital format is generally performed using default settings. For example, default resolution settings may comprise a 400 pixel per inch (ppi) by 1-bit setting for a text object while a 2400 ppi by 24-bit setting may be used for graphical objects, such as photographs or other multi-color objects. The resulting storage space (e.g., in an 8½×11 inch document) required for the objects is approximately two megabytes for a text object and 12 megabytes for a graphical object. Thus, to store both objects to retain quality and ensure that the textures, tones and hues of the original objects are maintained, the required resolution setting generally results in a very large storage size. For example, as described above, for objects containing a combination of media types, a higher resolution setting is generally used that corresponds to a particular media type of the combination (e.g., for a combination of text and photograph types, a resolution setting selected to maintain quality, colors, etc., for the photograph type), thereby resulting in a larger storage size for the object. Storing, converting, or otherwise manipulating raster digital documents with such default resolution settings also generally results in the same problem—a large amount of storage space is required.

SUMMARY OF THE INVENTION

In accordance with one embodiment of the present invention, an optimal resolution imaging system comprises a resolution engine adapted to apply at least one resolution rule to at least one zone of an object to determine an optimal reduced resolution setting for the at least one zone while maintaining a predetermined level of quality for the at least one zone.

In accordance with another embodiment of the present invention, an optimal resolution imaging method comprises applying at least one resolution rule to at least one zone of an object. The method also comprises determining an optimal reduced resolution setting for the at least one zone based on the at least one resolution rule while maintaining a predetermined level of quality for the at least one zone.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
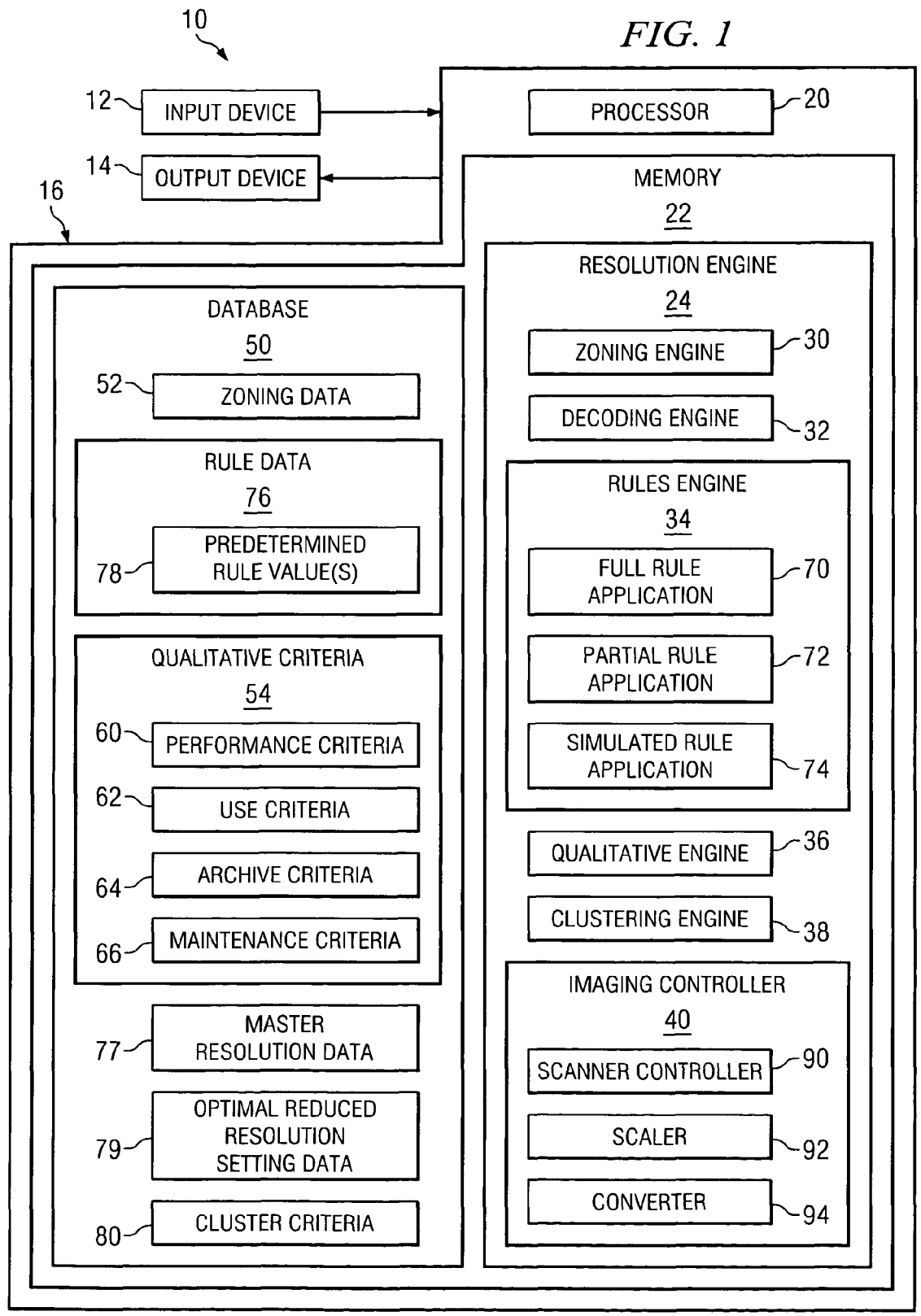
FIG. 1 is a diagram illustrating an embodiment of an optimal resolution imaging system in accordance with the present invention.

FIG. 1 is a diagram illustrating an embodiment of an optimal resolution imaging system 10 in accordance with the present invention. Briefly, optimal resolution imaging system 10 determines an optimal reduced resolution setting for scanning, representing and/or storing various regions or zones of a document or object. The optimal reduced resolution setting is a reduced resolution setting for the object, or for particular zones of the object, while minimizing quality degradation (e.g., a reduced resolution setting relative to a maximum or current resolution while maintaining a desired quality of resolution of the object), thereby resulting in a reduced storage size for the object and/or enabling re-generation of the object at a later time at an increased resolution setting (e.g., at a generally high quality level, acceptable and/or desired resolution level, etc.). For example, according to one embodiment of the present invention, a resolution rule is applied to different zones of an object to determine a level of quality degradation for the particular zones as resolution decreases for the particular zones. In some embodiments of the present invention, the resolution is optimally determined for each zone of the object based on the content contained within each zone such that, in some cases, different resolution settings are applied to each zone or groups of zones (e.g., in some applications or cases, the optimal resolution setting for one or more zones may be equivalent or substantially equivalent to the existing or present resolution setting such that a reduction to the resolution setting to particular zones is unnecessary and/or undesired while a reduction in a resolution setting for other zones is desired). Additionally, in some embodiments of the present invention, the particular resolution rule applied to the object zone(s) is determined by weighing or comparing performance, accuracy, and/or other qualitative criteria. Once the optimal reduced resolution setting is determined for each zone, the object and/or particular zones of the object are scaled, converted, re-scanned and/or otherwise manipulated using the corresponding optimal reduced resolution settings to enable storage of the object at a decreased size.

In the embodiment illustrated in FIG. 1, optimal resolution imaging system 10 comprises an input device 12, an output device 14, and an imaging system 16. Input device 12 may comprise any device for inputting information into system 16, or that system 16 may retrieve information from, including, but not limited to, a keyboard, mouse, scanning device, copy machine, digital camera, digital sender, facsimile device, multifunction device, or storage medium. Output device 14 may comprise a monitor, printer, or other type of device for outputting information from system 16.

As illustrated in FIG. 1, system 16 comprises a processor 20 and a memory 22. System 16 also comprises a resolution engine 24 which may comprise software, hardware, or a combination of software and hardware. In FIG. 1, resolution engine 24 is illustrated as stored in memory 22 so as to be accessible and executable by processor 20. However, it should be understood that resolution engine 24 may be otherwise stored, even remotely, so as to be accessible and executable by processor 20.

In the embodiment illustrated in FIG. 1, resolution engine 24 comprises a zoning engine 30, a decoding engine 32, a rules engine 34, a qualitative engine 36, a clustering engine 38, and an imaging controller 40. Zoning engine 30, decoding engine 32, rules engine 34, qualitative engine 36, clustering engine 38, and imaging controller 40 may comprise software, hardware, or a combination of software and hardware.

Zoning engine 30 identifies, segments and/or otherwise classifies the various regions or zones of a document or object. For example, if the object comprises analog information, such as a paper document scanned using a scanning device (e.g., a desktop or handheld scanner, an all-in-one device, or a digital camera), the analog data may be sent to an image map. The image map is used to identify and/or otherwise classify the various regions or zones of the object. An image map generally has a lower resolution (e.g., 75 pixels per inch (ppi)) than that required for optical character recognition (e.g., typically 300-400 ppi) or high-quality photo creation (e.g., typically 150-200 ppi). Thus, the image map values describing the locations of the regions or zones of the object are scaled proportionately to a desired resolution to accurately define the boundaries of such zones.

For particular types of objects and/or portions of objects (e.g., objects comprising digital information and/or raster data), zoning engine 30 cooperates with and/or otherwise causes decoding engine 32 to segment, identify and/or otherwise classify various regions or zones the object by decoding formatted information of the object. For example, if the object comprises digital information (e.g., .HTML, .DOC, or .PDF file formats) decoding engine 32 identifies and/or otherwise classifies various regions or zones of the object by decoding the digital format information. If the object comprises an uncompressed raster file (e.g., .BMP or .TIFF file formats), identifying and/or otherwise classifying various regions or zones of the object is performed using an image map as described above. In some embodiments of the present invention, system 10 is configured such that zoning engine 30 and/or decoding engine 32 automatically identifies and/or otherwise classifies the various zones of the object. However, alternatively or additionally, in other embodiments of the present invention, a user may identify and/or otherwise classify the various zones of the object. The information identifying and/or otherwise classifying the various zones of the object determined and generated by zoning engine 30 and/or decoding engine 32 is stored in a database 50 as zoning data 52.

Qualitative engine 36 identifies and selects particular resolution rule(s) to apply to each of the different zones of the object based on qualitative criteria 54. Qualitative criteria 54 comprises information associated with the requirements, settings, and/or specifications selected manually by a user or pre-configured based on, for example, the intended use of the object, desired user requirements or selections, the task to be performed by system 10, or other qualitative criteria. For example, in the embodiment illustrated in FIG. 1, qualitative criteria 54 comprises performance criteria 60, use criteria 62, archive criteria 64, and maintenance criteria 66.

Performance criteria 60 comprises information associated with the amount of time allotted for applying resolution rule (s) to an object via rules engine 34 and/or scanning (e.g., initial scan or re-scanning) various zones of the object at particular resolution settings. For example, in a scanning application, re-scanning various zones of the object at a reduced resolution setting and/or bit depth generally requires considerably less time than an original scan at a high resolution and/or bit depth. Additionally, in a commercial scanning application, the zones of the object may be re-scanned after zoning analysis and classification at a default resolution and/or bit depth. Thus, a reduction in the available scanning resolution settings may impact the time required for application of the resolution rules to the object and/or re-scanning of various zones of the object at particular resolution settings. In some embodiments of the present invention, different resolution rules applied by rules engine 34 to the object represent different levels of quality assurance as a function of performance. For example, a particular resolution rule having a particular resolution setting may provide the highest quality assurance, but may also have the greatest impact on performance. Thus, performance criteria 60 comprises information that may be used to correlate optimal resolution determination as a function of time and/or quality.

Use criteria 62 comprises information associated with the future use of the object after scanning, archiving, and/or capturing of the object data. For example, if the object will be used solely in a black/white copier-based archiving service, a lower resolution quality may be all that is required such that bit depth is generally irrelevant. However, re-purposing of the object (i.e., re-usage with different layouts or as part of a different document) may affect resolution settings. For example, if a re-purposing layout requires a specific resolution or data of sufficient quality to regenerate high-quality data of this specific resolution, a particular zone of the object may require storage at a particular resolution regardless of its optimal resolution. Thus, use criteria 62 comprises information that may be used to correlate a resolution value to a future use of the object.

Archive criteria 64 comprises information associated with an archiving methodology to be used for the object. For example, archiving may have several purposes ranging from digital copy storage (e.g., fax or copy quality) at a lower resolution setting to re-purposing enabling (e.g., .PDF or .HTML quality) at a high end resolution setting. Thus, archive criteria 64 comprises information associated with correlating a resolution value to particular archiving methodologies.

Maintenance criteria 66 comprises information associated with optimizing information maintenance for information contained in one or more zones of the object. For example, scaling of resolution may be considered a way of optimizing information maintenance when a final object storage size is smaller than that indicated by an optimal resolution. For example, maintenance criteria 66 may comprise information associated with determining a reduced resolution setting for the object while conserving memory storage capacity. Thus, for example, a photograph created with 120 ppi of information (e.g., a half-toning frequency of 120 ppi is used to generate it) need not be stored at 300 ppi because the extra resolution requirement is generally used only to over sample the half-toning artifacts. Thus, maintenance criteria 66 comprises information that may be used to correlate a resolution value to an optimal information retention requirement.

Rules engine 34 applies resolution rule(s) to each of the different zones of the object to determine whether an optimal reduced resolution setting is available and/or desirable for corresponding zone(s) of the object. For example, based on qualitative criteria 54, qualitative engine 36 selects a particular rule corresponding to user-selected qualitative criteria 54 or qualitative criteria 54 predetermined and configured within system 16. In the embodiment illustrated in FIG. 1, rules engine 34 comprises a full rule application 70, a partial rule application 72, and a simulated rule application 74. Rule applications 70, 72, and 74 generate rules data 76 as a function of resolution. For example, rule applications 70, 72 and 74 may each correspond to a particular performance or quality level including, but not limited to, a function of the step size and resolution. Thus, based on qualitative criteria 54, qualitative engine 36 selects a particular rule application 70, 72, or 74 for rules engine 34 to apply to the different zones of the object.

In the embodiment illustrated in FIG. 1, three levels of resolution rules are illustrated at varying levels of performance and/or quality assurance with full rule application 70 being at a relatively high level of performance and/or quality assurance and simulated rule application 74 at a relatively lower level of performance and/or quality assurance. However, it should be understood that a greater or lesser quantity of rules at a variety of different quality levels may be used. Full rule application 70 comprises creating and analyzing a particular zone of the object at a resolution less than a master resolution 77 (e.g., a highest desired or available resolution setting (e.g., for an initial scan) and/or a resolution of the object as originally created/scanned/stored (e.g., for an archived and/or stored object)). The lower-resolution data is scaled upwardly and/or downwardly relative to the master resolution 77 of the object and a correlation between the two images is performed. For example, the correlation between the master resolution data 77 and the scaled lower resolution data may be defined as follows:

$$C=(E(XY)-E(X)E(Y))/\sqrt{\text{Var}(X)*\text{Var}(Y)}$$

where C represents the metric or value of the full rule analysis, X and Y represent the compared zones(s) (e.g., compared raster images or maps where one of X or Y represents the image zone at the master resolution 77 and the other of X or Y represents the image zone at a lower resolution setting), E represents an expected value (or mean) for the particular X and Y zone(s), and Var represents the variance within the particular X and Y zone(s).

Partial rule application 72 comprises a faster resolution analysis than full rule application 70 by analyzing sub-sections or portions of each zone of the object. For example, particular sub-sections of a particular zone of the object that are likely to degrade more rapidly in terms of resolution than others (e.g., particular pixel intensities, hues and/or saturation values) can be identified to reduce the computational burden in comparing or correlating re-scaled image data to the master resolution image data. In one embodiment, identifying areas likely to degrade more rapidly in terms of resolution than others are performed by using an entropy or edge map combined with a tile or shape-segmenting system to localize such areas for correlation. The entropy map comprises a map of such localized content in an image and enables an analysis similar to a fast fourier transform (FFT). The entropy of each pixel may be computed from the sum of absolute differences between it and its neighbors and may be plotted on a logarithmic scale. The locations of high pixel-to-pixel variance may be computed by threshholding entropy maps or by other means giving a higher value to such areas of content. However, it should be understood that other methodologies may also be used.

Simulated rule application 74 in the illustrated embodiment provides the fastest means of generating a general description of how well frequency content is maintained using a simulated or synthetic quality assurance analysis afforded by a two-dimensional FFT. For example, simulated rule application 74 may be used to determine the quantity of high frequency content that may be aliased at lower frequencies.

Figure 2:
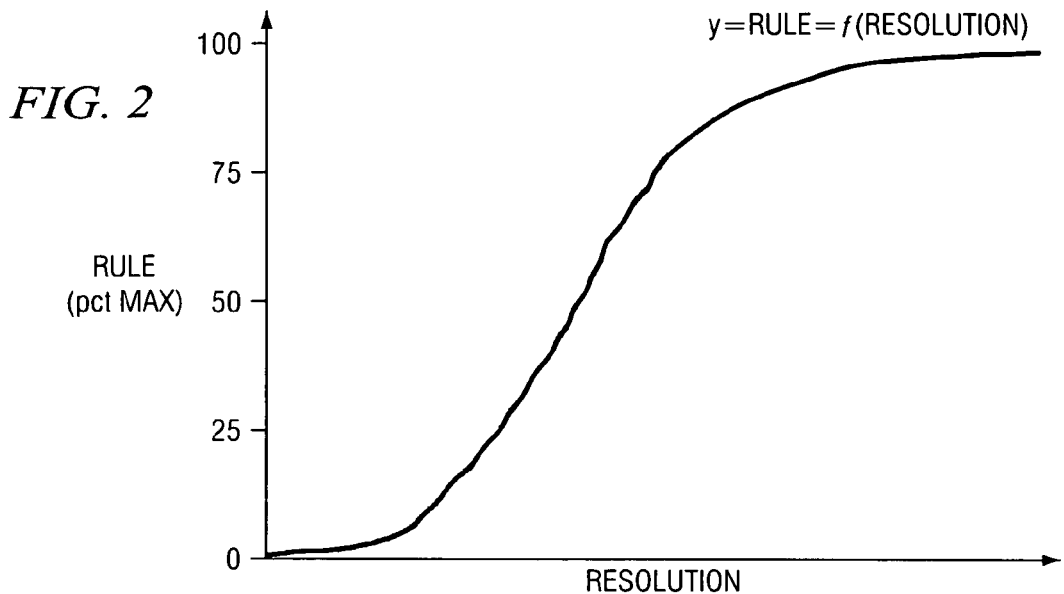
FIG. 2 is a diagram illustrating a relationship between a resolution rule and a resolution value in accordance with the present invention.

Thus, in operation, rules engine 34 applies a resolution rule to each of the different zones of the object and generates rules data 76 for each corresponding zone. Rules engine 34 may apply a single rule to each zone of the object or may apply different rules to different zones of the object. Rules engine 34 also evaluates rules data 76 with a predetermined rule value 78 to determine an optimal reduced resolution setting for each of the different zones of the object. For example, as illustrated in FIG. 2, rules engine 34 may determine and/or plot a generalized curve defining a relationship between a particular rule application and resolution. Predetermined rule value 78 may correspond to a particular rule value, which may be equal to or less than a 100 percent rule value, to be used to define and identify the optimal reduced resolution setting for the particular zone of the object while maintaining a desired level of quality for the zone. For example, as illustrated in FIG. 2, a curve may be plotted illustrating how a particular rule application (indicative of the output quality of the zone) increases with increasing resolution until asymptotically reaching its final value, presumably 100 percent resolution quality. In FIG. 2, the curve is illustrated as a simple sigmoidal curve; however, it should be understood that in other cases, the curve and associated analysis may be varied. For example, rules engine 34 may predict the resolution at which the rule reaches 100 percent by empirically choosing the resolution at which the rule is 95 percent or greater of the master resolution value, by piecewise-linear curve fitting, such as extrapolating the 25%-75% range to 0%-100%, or by a pre-set or optimized quality setting, such as by selecting predetermined rule value 78 at a particular level. The optimal reduced resolution setting for each zone of the object is illustrated in FIG. 1 as optimal reduced resolution setting data 79.

Clustering engine 38 is used to cluster or bundle adjoining zones of the object based on optimal reduced resolution setting values. For example, if adjoining zones of the object are determined to have equivalent (or substantially equivalent) optimal reduced resolution settings, the zones may be treated identically and, therefore, combined into a single zone. It should be understood that various clustering techniques may be used. The various techniques used for clustering zones of the object may be stored as cluster criteria 80.

Imaging controller 40 is used to re-scan, scale, convert, or otherwise manipulate the data of the object using the optimal reduced resolution setting values determined by rules engine 34. For example, in the embodiment illustrated in FIG. 1, imaging controller 40 comprises a scanner controller 90, a scaler 92, and a converter 94. Scanner controller 90 is used to re-scan the object, if applicable, using optimal reduced resolution setting values during the re-scanning procedure as determined and identified by rules engine 34 for corresponding zones of the object (e.g., for zones of the object in which an optimal reduced resolution setting is available and/or desirable). Scaler 92 is used to scale image data for corresponding zones of the object corresponding to determined optimal reduced resolution setting values, and converter 94 is used to convert image data corresponding to the determined optimal reduced resolution setting values (e.g., scaling and/or converting previously created and/or stored data of the object using the determined optimal resolution values). Thus, for example, in an archived object application, an object is retrieved from an archive or storage location and analyzed using resolution engine 24. As described above, resolution engine 24 is used to determine whether an optimal reduced resolution setting for each zone of the object is available and/or desired. Using the determined optimal reduced resolution setting values, imaging controller 40 scales, converts, transforms and/or otherwise manipulates the zone(s) of the object to the reduced resolution settings. The object is then returned and/or re-stored in the archive or storage area, thereby replacing the original object in the archive with an object having a reduced storage size.

In a scanning application, for example, an original scan of an object may be performed at master resolution 77 or another desired resolution setting. The scanned image is analyzed using resolution engine 24 to determine whether an optimal reduced resolution setting is available and/or desirable for each zone of the object. Using the determined optimal reduced resolution setting values, the object may be re-scanned, scaled, converted and/or transformed. For example, if the object comprises different types of image content (e.g., images, text, tables, etc), the determined optimal reduced resolution settings for each zone of the object may vary, and the highest determined optimal reduced resolution setting for any one zone of the object may be less than the originally scanned resolution setting for the object. Thus, in this example, the entire object may be re-scanned at the highest determined optimal reduced resolution setting, and then corresponding zones of the object having lesser determined optimal reduced resolution settings may be scaled, converted and/or otherwise transformed to their corresponding determined optimal reduced resolution settings, thereby resulting in a reduced storage size for the object.

Thus, in operation, based on a particular performance and/or quality level, particular resolution rule(s) are applied to different zones of an object to determine an optimal resolution for each zone of the object. In some embodiments or applications of the present invention, a single resolution rule is applied to all zones of an object. However, in other embodiments or applications of the present invention, different resolution rules may be applied to different zones of the object. Each zone of the object may then be re-scanned, scaled, converted, or otherwise manipulated using the optimal resolution values, thereby resulting in a reduced storage capacity for the object while maintaining a desired image quality.

Figure 3:
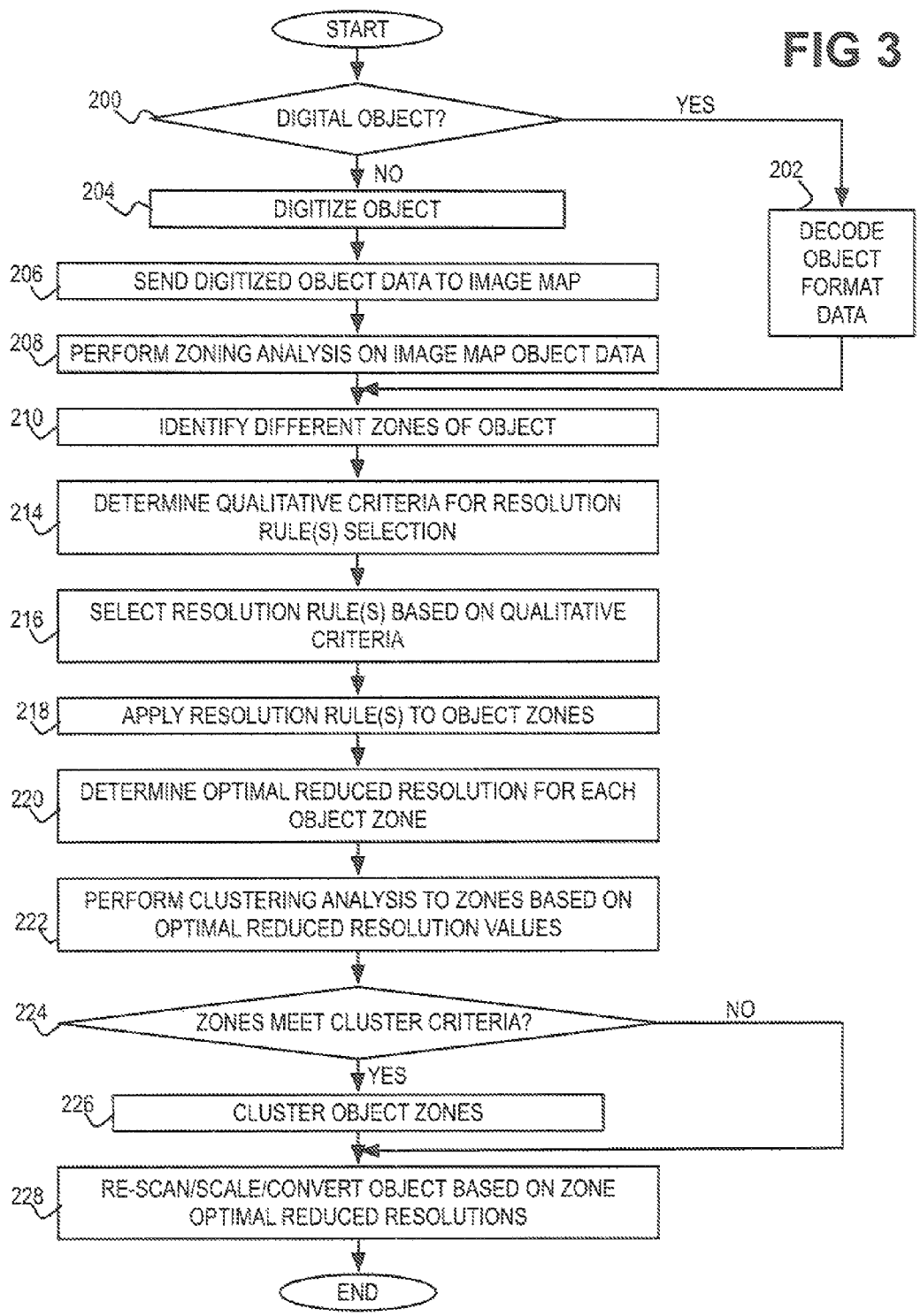
FIG. 3 is a flow chart illustrating an embodiment of an optimal resolution imaging method.

FIG. 3 is a flowchart illustrating an embodiment of an optimal resolution imaging method in accordance with the present invention. The method begins at decisional block 200, where a determination is made whether the object is currently in digital format. If the object is currently in digital format, the method proceeds to block 202, where zoning engine 30 cooperates with and/or otherwise causes decoding engine 32 to decode the object format data to identify and/or otherwise classify various zones of the object. The method proceeds to block 210. If the object is not currently in digital format, the method proceeds from block 200 to block 204, where the object is digitized, for example, by using input device 12 such as a scanner or other type of digitizing device. At block 206, the digitized object data is sent to an image map. At block 208, zoning engine 30 performs a zoning analysis on the image map object data. At block 210, zoning engine 30 identifies and/or otherwise classifies the different zones of the object.

At block 214, qualitative engine 36 determines qualitative criteria 54 required for selecting a particular resolution rule to apply to each of the different zones of the object. For example, as described above, a user of system 10 may select various qualitative options using input device 12 or system 16 may be pre-configured to automatically identify various qualitative criteria 54 based on information acquired relating to the object. At block 216, qualitative engine 36 selects a particular resolution rule, such as either full rule application 70, partial rule application 72, or simulated rule application 74, based on qualitative criteria 54. In some embodiments of the present invention, a particular resolution rule is selected by qualitative engine 36 to apply to the entire object. However, it should be understood that in other embodiments of the present invention, different resolution rules may be selected and/or applied to different zones of the object.

At block 218, rules engine 34 applies the resolution rule(s) selected at block 216 to the different zones of the object. At block 220, rules engine 34 determines an optimal resolution for each object zone. At block 222, clustering engine 38 performs a clustering analysis to the different zones of the object based on the optimal resolution values determined by rules engine 34. At decisional block 224, a determination is made whether various zones of the object meet cluster criteria 80. If various zones of the object do not meet cluster criteria 80, the method proceeds from block 224 to block 228. If various zones of the object do meet cluster criteria 80, the method proceeds from block 224 to block 226, where clustering engine 38 clusters various object zones. At block 228, imaging controller 40 is used to re-scan, scale, convert, or otherwise manipulate object data based on the optimal resolution values determined for each zone of the object.

Figure 4:
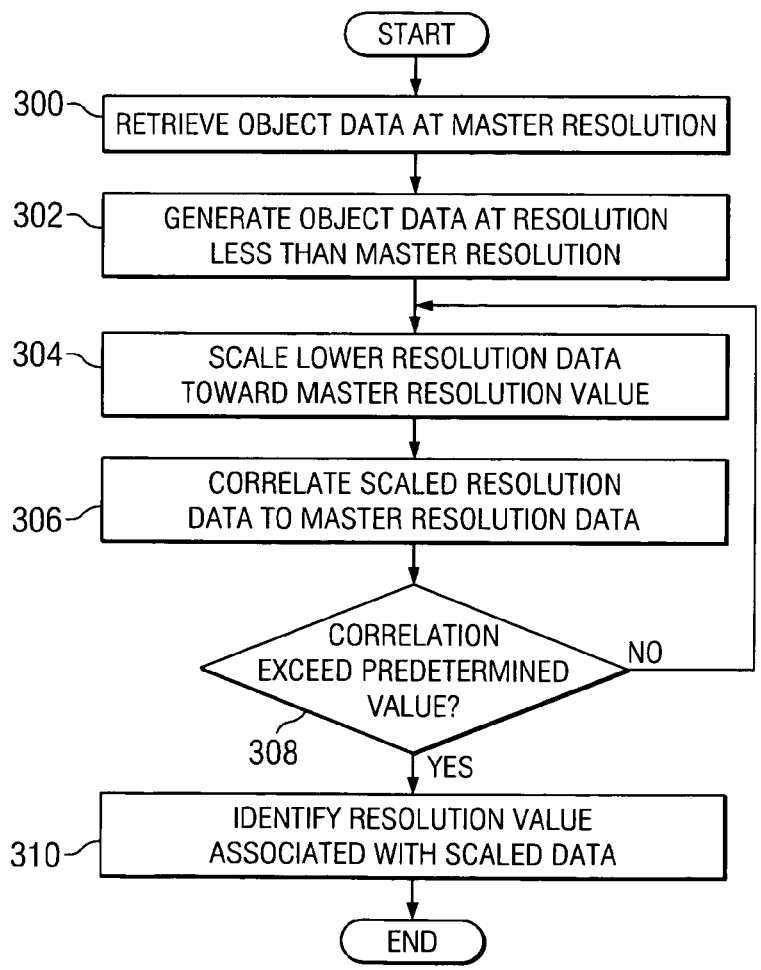
FIG. 4 is a flow chart illustrating another embodiment of an optimal resolution imaging method in accordance with the present invention.

FIG. 4 is a flowchart illustrating another embodiment of an optimal resolution imaging method in accordance with the present invention. The method begins at block 300, where rules engine 34 retrieves object data at the master resolution 77. At block 302, rules engine 34 creates and/or otherwise generates image data for the object at a resolution less than the master resolution 77 (e.g., via re-scanning, scaling, converting, etc.). At block 304, rules engine 34 scales the lower resolution object data upwardly towards the master resolution 77 value. At block 306, rules engine 34 correlates the scaled resolution data to the master resolution data using a particular resolution rule. At decisional block 308, a determination is made whether the correlated values exceed a predetermined value, such as predetermined rule value 78. If the correlated values do not exceed a predetermined value, the method returns to block 304. If the correlated value exceeds a predetermined value, thereby indicating a desired optimal resolution value for the object and/or zone of the object, the method proceeds to block 310, where rules engine 34 identifies the optimal resolution value associated with the scaled object data. The optimal resolution value determined for the object and/or zone of the object is used for storing the object data (e.g., via re-scanning, converting, scaling and/or otherwise manipulating the object data).

Thus, embodiments of the present invention enable a reduction in the storage capacity used for storing image data for an object by determining an optimal resolution setting for each zone of the object. The optimal resolution setting(s) for the object are used to re-scan, convert, scale and/or otherwise manipulate the object image data to reduce the storage size for the object. Thus, embodiments of the present invention may be applied to an image library (e.g. archived image data), used upon the creation of object image data, or elsewhere. Additionally, embodiments of the present invention enable optimal resolution settings to be determined for the object (e.g., the entire object or particular zones of the object) based on desired qualitative parameters. It should be understood that in the embodiments of the method of the present invention described in FIGS. 3 and 4, certain functions may be omitted, combined, or accomplished in a sequence different than depicted in FIGS. 3 and 4. Also, it should be understood that the methods depicted in FIGS. 3 and 4 may be altered to encompass any of the other features or aspects described elsewhere in the specification.

What is claimed is:

1. A method comprising:

scanning a document as a whole at a first resolution, using a scanning device, yielding first data of the document at the first resolution;

generating, by a computing device, second data of the document at a second resolution from the first data of the document, the second resolution being lower than the first resolution;

after generating the second data of the document at the second resolution, segmenting, by the computing device, the document into a plurality of zones, using the second data of the document;

for each zone of the document,
  determining, by the computing device, an optimal resolution for the zone of the document, by applying one or more resolution rules to the zone;
  where the optimal resolution for the zone is lower than the first resolution,
    rescanning the zone of the document at a third resolution equal to the optimal resolution, using the scanning device, yielding third data of the zone of the document at the optimal resolution;
    replacing, by the computing device, the first data of the document at the first resolution that pertains to the zone with the third data of the zone of the document at the optimal resolution that is lower than the first resolution, wherein after performance of the method, the document is at the first resolution for each zone for which the optimal resolution is not lower than the first resolution, and is at the third resolution for each zone at which the optimal resolution is lower than the first resolution.

2. The method of claim 1, further comprising selecting the resolution rules based on an archiving method used to store the first data of the document.

3. The method of claim 1, further comprising selecting the resolution rules based on a time period for rescanning the zones of the document.

4. The method of claim 1, further comprising selecting the resolution rules based on qualitative criteria.

5. The method of claim 1, wherein segmenting the document into the zones segmenting the document into the zones based on a type of content contained in each zone.

6. The method of claim 1, wherein the zones of the document are clustered based on the optimal resolutions for the zones.

7. A system comprising:
  a scanner to scan a document as a whole at a first resolution to yield first data of the document at the first resolution;
  a zoning engine to generate second data of the document at a second resolution from the first data of the document, the second resolution being lower than the first resolution, and after generating the second data, to segment the document into a plurality of zones, using the second data of the document;
  a resolution engine to, for each zone of the document, determine an optimal resolution, by applying one or more resolution rules to the zone; and,
  a processor to execute instructions from the zoning engine and the resolution engine to, for each zone of the document for which the optimal resolution is lower than the first resolution,
    cause the scanner to rescan the zone of the document at a third resolution equal to the optimal resolution to yield third data of the zone at the optimal resolution, and
    replace the first data of the document at the first resolution that pertains to the zone with the third data of the zone at the optimal resolution that is lower than the first resolution,
  wherein ultimately the document is at the first resolution for each zone for which the optimal resolution is not lower than the first resolution, and is at the third resolution for each zone at which the optimal resolution is lower than the first resolution.

8. The system of claim 7, wherein the resolution engine is to select the resolution rules based on an archiving method used to store the first data of the document.

9. The system of claim 7, wherein the resolution engine is to select the resolution rules based on a time period for rescanning the zones of the document.

10. The system of claim 7, wherein the resolution engine is to select the resolution rules based on qualitative criteria.

11. The system of claim 7, wherein the zoning engine is to segment the document into the zones based on a type of content contained in each zone.

12. The system of claim 7, wherein the zones of the document are clustered based on the optimal resolutions for the zones.

13. A system comprising:
  a scanner to scan a document as a whole at a first resolution to yield first data of the document at the first resolution;
  means for generating second data of the document at a second resolution from the first data of the document, the second resolution being lower than the first resolution, and, after generating the second data, for segmenting the document into a plurality of zones, using the second data of the document;
  means for, for each zone of the document, determining an optimal resolution, by applying one or more resolution rules to the zone; and,
  means for, for each zone of the document for which the optimal resolution is lower than the first resolution,
    causing the scanner to rescan the zone of the document at a third resolution equal to the optimal resolution to yield third data of the zone at the optimal resolution, and
    replacing the first data of the document at the first resolution that pertains to the zone with the third data of the zone at the optimal resolution that is lower than the first resolution,
  wherein ultimately the document is at the first resolution for each zone for which the optimal resolution is not lower than the first resolution, and is at the third resolution for each zone at which the optimal resolution is lower than the first resolution.

14. The system of claim 13, wherein the means for determining the optimal resolution is further for selecting the resolution rules based on an archiving method used to store the first data of the document.

15. The system of claim 13, wherein the means for determining the optimal resolution is further for selecting the resolution rules based on a time period for rescanning the zones of the document.

16. The system of claim 13, wherein the means for determining the optimal resolution is further for selecting the resolution rules based on qualitative criteria.

17. The system of claim 13, wherein the means for generating the second data and for segmenting the document into the zones is for segmenting the document into the zones based on a type of content contained in each zone.

18. The system of claim 13, wherein the zones of the document are clustered based on the optimal resolutions for the zones.

* * * * *

UNITED STATES PATENT AND TRADEMARK OFFICE
CERTIFICATE OF CORRECTION

PATENT NO. : 8,390,874 B2
APPLICATION NO. : 10/989781
DATED : March 5, 2013
INVENTOR(S) : Steven J. Simske et al.

Page 1 of 1

It is certified that error appears in the above-identified patent and that said Letters Patent is hereby corrected as shown below:

In the Claims:

In column 9, line 38, in Claim 5, delete "segmenting" and insert -- is for segmenting --, therefor.

Signed and Sealed this
Ninth Day of July, 2013

Teresa Stanek Rea
*Acting Director of the United States Patent and Trademark Office*